(12) United States Patent
Hiltunen

(10) Patent No.: US 6,873,863 B2
(45) Date of Patent: Mar. 29, 2005

(54) TOUCH SENSITIVE NAVIGATION SURFACES FOR MOBILE TELECOMMUNICATION SYSTEMS

(75) Inventor: Kari Hiltunen, Helsinki (FI)

(73) Assignee: Nokia Mobile Phones Ltd., Espoo (FI)

( * ) Notice: Subject to any disclaimer, the term of this patent is extended or adjusted under 35 U.S.C. 154(b) by 707 days.

(21) Appl. No.: 09/812,077

(22) Filed: Mar. 19, 2001

(65) Prior Publication Data

US 2002/0132634 A1 Sep. 19, 2002

(51) Int. Cl.[7] ............................................. H04M 1/00
(52) U.S. Cl. .................... 455/575.1; 455/350; 455/566; 455/569.1
(58) Field of Search ............................. 455/569.1, 566, 455/575.1, 350, 410, 411

(56) References Cited

U.S. PATENT DOCUMENTS

| | | | |
|---|---|---|---|
| 4,654,546 A | | 3/1987 | Kirjavainen |
| 4,885,783 A | * | 12/1989 | Whitehead et al. ......... 381/191 |
| 5,623,552 A | * | 4/1997 | Lane .......................... 382/124 |
| 5,740,261 A | * | 4/1998 | Loeppert et al. ............ 381/355 |
| 5,757,090 A | | 5/1998 | Kirjavainen |
| 5,917,437 A | * | 6/1999 | Ojala et al. ................... 341/34 |
| 6,072,475 A | * | 6/2000 | van Ketwich ............... 345/173 |
| 6,324,907 B1 | * | 12/2001 | Halteren et al. .............. 73/431 |
| 2001/0024712 A1 | * | 9/2001 | Kirjavainen et al. ........ 428/156 |
| 2002/0110465 A1 | * | 8/2002 | Lai et al. ..................... 417/417 |

FOREIGN PATENT DOCUMENTS

| | | |
|---|---|---|
| EP | 0775049 | 12/1999 |
| WO | 9822785 | 5/1998 |
| WO | 9956498 | 11/1999 |

* cited by examiner

Primary Examiner—Edward F. Urban
Assistant Examiner—Duy K Le
(74) Attorney, Agent, or Firm—Ware, Fressola, Van der Sluys & Adolphson LLP (57) ABSTRACT

A touch sensitive navigational surface functions as a user interface to a communication device such as a cellular telephone. An electromechanical dielectric (EMD) film coextensive with at least a portion of the surface of the cover of the device selectively functions as a sensor, microphone or speaker. The EMD film is placed behind a display to provide a user interface touch sensitive screen capable of sensing the direction of touching. At least a portion of the EMD film functions as a fingerprint recognition system to provide security means for controlling access and limiting call completion to an authorized user.

24 Claims, 5 Drawing Sheets

TOUCH SENSITIVE NAVIGATION SURFACES FOR MOBILE TELECOMMUNICATION SYSTEMS

TECHNICAL FIELD

The present invention relates generally to touch sensitive surfaces and deals more particularly with providing a touch sensitive navigational surface as a user interface and more specifically for a communication device.

BACKGROUND OF THE INVENTION

Communication devices such as for example, cellular phones and mobile radiophones typically have mechanical or contact switches for a keypad to dial a phone number or as function keys to access features or other capabilities of the communication device. Additionally, such devices typically have a carbon or electret microphone and a miniature voice coil or piezoelectric or other such type speaker to convert audio signals to electrical signals or to convert electrical signals to audio, respectively. Likewise, separate switches such as roller switches or directional switches are typically provided to scroll a menu or selection functions, i.e. phone number lists, volume increase/decrease, ringing tones, and the like, presented on a display screen of the communication device. Although touch screen technology can function as a user-interface by allowing a user to "touch" an area of the screen to choose a desired one of a number of preprogrammed possible selections, such technology is limited to display screens only.

It would be desirable therefore to provide a communication device having "touch" sensitive surfaces that function as a sensor, microphone or speaker to replace the various discrete individual components performing the corresponding functions in current communication devices and to enhance the operation of the device.

SUMMARY OF THE INVENTION

An object of the invention is to provide a method and related apparatus for a new sensor system for communication devices using an electromechanical dielectric (EMD) film coextensive with at least a portion of the surface of the device.

A further object of the invention is to provide a touch sensitive navigational surface as a user interface for a communication device.

Another object of the invention is to provide a communication device in which any surface of the device can be made to act as sensor, microphone or speaker.

Yet another object of the invention is to provide a communication device wherein the sensors are integrated with the physical structural components of the communication device by injection molding.

Further objects of the invention will become apparent in the following specification wherein the detailed description is provided for purposes of disclosing the invention without placing limitations thereon.

In a first aspect of the invention, a method for providing a sensor system in a communication device is presented. The method includes the steps of: providing an electromechanical dielectric (EMD) film integral with the surface of the cover of the communication device; providing one or more open areas in the outer surface regions in the cover for accessing the EMD film wherein the open area corresponds to the operational function to be implemented; and coupling the EMD film in each of the exposed regions to electronic circuit means associated with the corresponding operational function of the communication device.

Preferably, the step of providing one or more voided or open areas in the outer surface region includes providing one or more open areas in the inner surface region of the cover in those areas where the EMD film requires unobstructed movement to perform the desired operational function of transforming an acoustic signal to a corresponding electrical signal and transforming an electrical signal to a corresponding acoustic signal.

Preferably, the method further includes the step of providing a display in one of the voided areas with the rear surface of the display facing and in contact with the surface of the EMD film.

Preferably, the step of providing the EMD film integral with the surface of the cover includes the step of injection molding the cover with the EMD film.

In a second aspect of the invention, a communication device embodying the invention is presented. The communication device includes an electromechanical (EMD) film coextensive with at least a portion of the surface of the cover of the communication device; one or more voided or open areas in the outer surface regions in the cover for accessing a portion of the EMD film wherein a given voided area in the surface of the cover corresponds to the operational function to be implemented; electronic circuit means coupled to the EMD film for sensing electrical signals generated by the EMD film in response to a force applied to the surface and for displacing the surface of the EMD film with respect to a plane of the surface of the cover in response to electrical signals generated by the electronic circuit means.

Preferably, the EMD film functions as a speaker.

Preferably, the EMD film functions as a microphone.

Preferably, the EMD film functions as a keypad.

Preferably, the communication device further includes a display in contact with the EMD film whereby the EMD film is responsive to sensing the direction of touching on the surface of the display.

In a further aspect of the invention, a portable, handheld communication device of the type having means for establishing a communication link between itself and a remote communication device is presented and includes a case having at least a first portion molded from material responsive to displacement for generating an electric signal, and at least a second portion molded from material responsive to electric signals for displacement of said material proportional to the magnitude of the electrical signal.

Preferably, the first portion and the second portion are molded from electromechanical dielectric (EMD) film, and the EMD film is coextensive with at least a portion of the surface of the case.

Preferably, the communication device further includes security means for controlling access limiting call completion to an authorized user.

Preferably, the security means includes at least a portion of the EMD film configured as a fingerprint recognition system.

In a yet further aspect of the invention, a method for providing touch-sensitive surface functionality in a conventional communication device is presented. The method includes the steps of: providing an electromechanical dielectric (EMD) film with a first major surface having adhesion properties; placing the first adhesion major surface in contact with a desired location of a surface of the communication device; and coupling the EMD film to electronic circuit means associated with the corresponding operational function of the communication device.

Preferably, the method includes the steps of providing an EMD film with a second major surface disposed opposite the first major surface and having adhesion properties and locating the EMD film between the cover of the device and a display screen of the device, whereby the EMD film holds the display in place to provide a touch-sensitive screen.

Preferably, the method further includes the steps of: providing an EMD film with a second major surface disposed opposite the first major surface; providing a flexible protective layer on the second major surface; and attaching the adhesion major surface of the EMD film to a desired location on the surface of the device, whereby the protective layer faces outward for touching contact by a user.

In a still further aspect of the invention, a conventional communication device having touch-sensitive surface functionality is presented. The communication device includes an electromechanical dielectric (EMD) film with a first major surface having adhesion properties and a second major surface oppositely disposed the first major surface, whereby the adhesion major surface holds the EMD film in contact with a desired location on the surface of the communication device, and means for coupling the EMD film to electronic circuit means associated with the corresponding operational function of the communication device.

Preferably, the communication device further includes the EMD film second major surface having adhesion properties and a display in contact with and held by the EMD film second major surface.

Preferably, the communication device further includes the EMD film second major surface having a flexible protective layer.

DETAILED DESCRIPTION OF PREFERRED EMBODIMENTS

Figure 1:
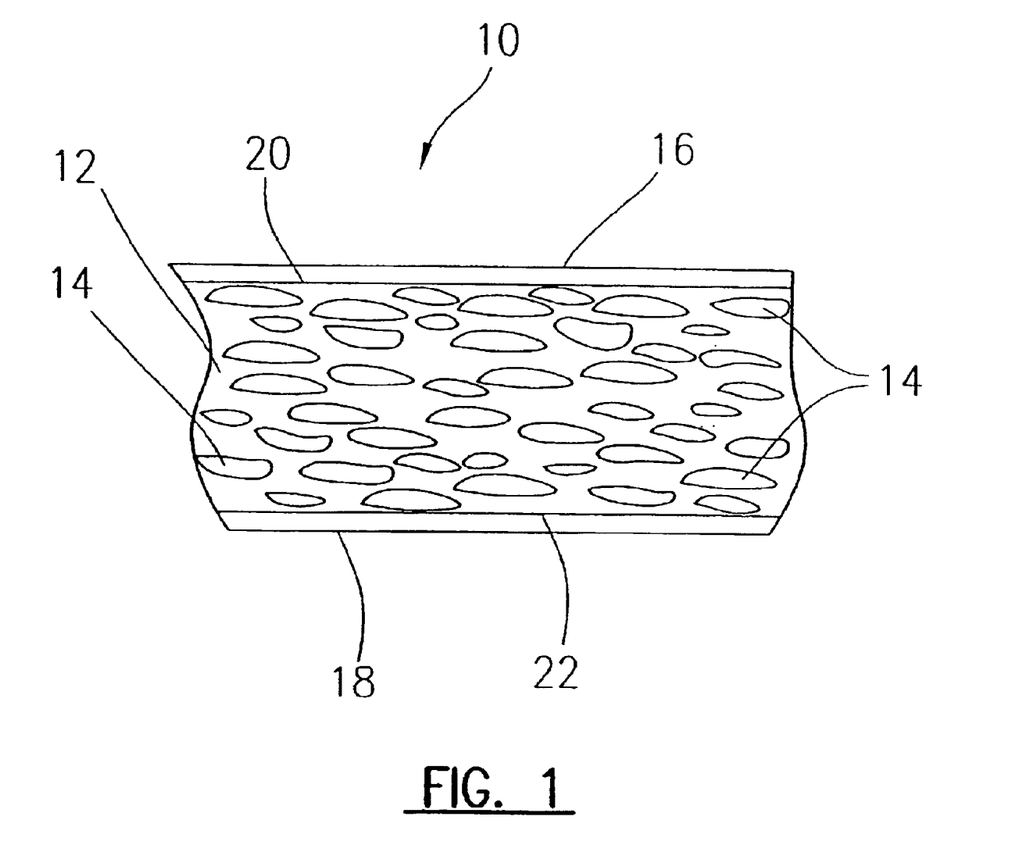
FIG. 1 is a cross-sectional view of the structure of the electromechanical dielectric (EMD) film used with the present invention.

Turning now to the drawings and considering the invention in further detail, an electromechanical dielectric (EMD) film is illustrated schematically in cross-sectional view in FIG. 1 and is generally designated 10. The EMD film 10 is a foil like and flexible polymer film with a permanent electric charge. When a mechanical or acoustic force is applied to the surface, the EMD film generates a voltage that can be detected. Therefore the EMD film functions as sensor in this configuration. The EMD film also works in the opposite direction that is, converting an applied electrical potential to displace the film relative to the plane of the surface. Therefore, the EMD film functions as an actuator in this configuration.

Figure 2:
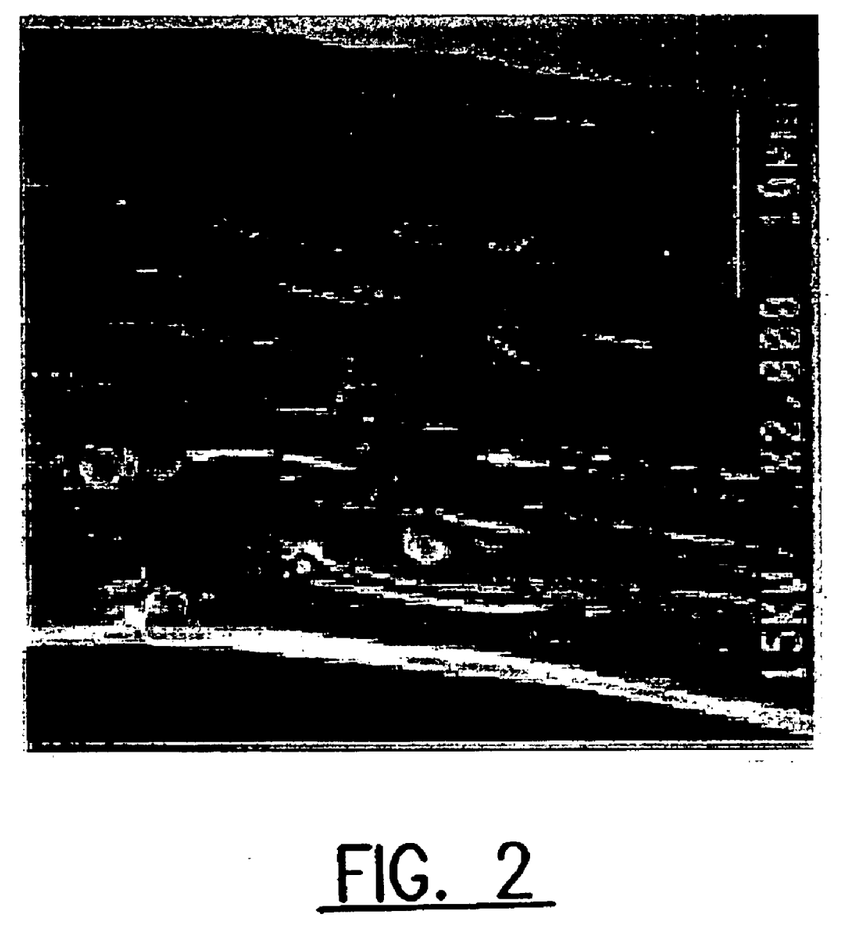
FIG. 2 is a representation of an electron microscope photo of a cross-section of the structure of the EMD film.

Still referring to FIG. 1, the EMD film 10 is made of a thin (about 0.50 $\mu$m) biaxial-oriented polypropylene 12. The biaxial orientation and special additives produce many small flat bubbles 14 in the material and these bubbles give the EMD film its properties. A permanent electric charge is injected into the EMD material during the manufacturing process. Thin metal electrodes 16, 18 are evaporated or laminated on both surfaces 20, 22 of the film to complete the EMD structure. FIG. 2 shows a representation of an electron microscope photo of a cross section of the EMD film structure. Further details on the construction and principles of operation of the EMD film may be had from literature commonly available in the art and from U.S. Pat. No. 4,654,546 entitled, "Electromechanical Film and Procedure for Manufacturing Same." The electromechanical dielectric film such as that used in the present invention is available commercially under the trade name "EMFi™".

Figure 3:
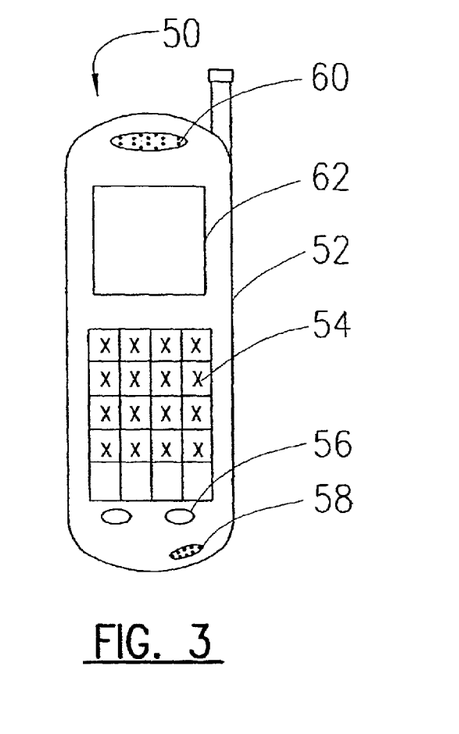
FIG. 3 is a schematic representation of a cellular phone embodying the sensor system of the present invention.

Turning now to FIG. 3, a schematic representation of a cellular phone embodying the sensor system of the present invention is illustrated therein and is generally designated 50. The cellular phone 50 is conventional in appearance in the illustration in FIG. 3 and includes a case 52 typically molded of a thermoplastic polymer material or other materials now known or future developed for use in such applications. An alphanumeric keypad 54 is provided as a user interface for example, for inputting phone numbers to be dialed, inputting alphanumeric characters into a memory for subsequent retrieval, accessing functions of the cellular phone and for other such operations typically well known to those in the cellular phone art. Additional keys or buttons 56 corresponding to additional features of the cellular phone may also be present. The microphone is located in the region designated 58 to receive and convert audio signals, such as speech, into corresponding electrical signals for use with the cellular phone. An earpiece is located in the region 60 to convert electrical signals received and processed in the cellular phone to audio signals such as speech for communicating with the user. A display generally designated 62, shows typical messages and graphics associated with cellular phone operation, such as the number dialed, menu functions, text messages, and other such graphics as is commonly known in the cellular telephone art. The EMD film must be solidly supported along one major face side when it is used as a sensor because it is so thin (approximately 50 $\mu$m), it would deflect and not respond to light touches or forces applied to its opposite unsupported side. Additionally, a sensor built from the EMD film would be extremely light and not add weight or bulk to a communication device. As will become more apparent below, the keypad, microphone, speaker and display functions can be implemented utilizing the EMD film with corresponding electrical circuitry of the cellular phone to perform the intended functions.

Figure 4:
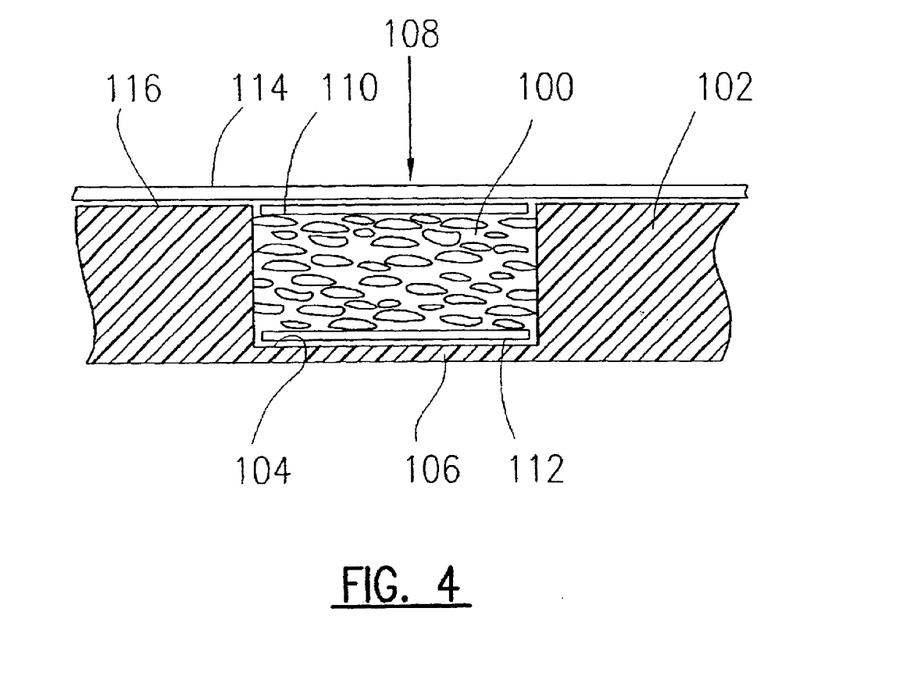
FIG. 4 is a schematic cross sectional view of the EMD film supported for use as a sensor.

FIG. 4 is a schematic cross-sectional fragmentary view of the EMD film supported for use as a sensor in accordance with the present invention. In the illustrated example, the EMD film generally designated 100, is shown supported by the surface 104 formed by the relief area 106 formed in the case or cover 102. A force such as a touching force applied in the direction 108 causes the outer surface 110 of the EMD film 100 to move slightly in the direction 108. The support surface 104 of the relief area 106 prevents flexing or movement of the bottom side 112 of the EMD film thus the film can be compressed or deformed when touched to generate a corresponding electrical signal. A thin flexible protective polymer layer 114 covers the surface 110 of the EMD film and the surface 116 of the cover 102. Although the relief support area is somewhat exaggerated in the figures for purposes of description, in actuality the EMD film is substantially thinner than the thickness of the cover and is readily integrated as part of the surface of the cover.

The EMD film can be electrically coupled to a resistive ladder network to provide increasing and decreasing in accordance with the direction of touching on the surface of the cover. Such a ladder network might be used for example as a volume control for the audio in the form of speech or in the form of ringing tones, response verification tones and the like. Another application could be to increase or decrease the illumination of a display screen keypad, or other selection key.

One method of manufacturing an integrated EMD film coextensive with the surface of a case or cover made from a plastic, polymer or other such material is to use a multi-component injection molding process. The injection molding process can be used to provide a touch-sensitive surface area of the cover. In the multicomponent injection molding process, the first step is to injection mold the hard portion of the cover which provides the support surface for the EMD film in a sensor application. The next step is to place the EMD film into the mold in an orientation such that the EMD film is in contact with its support surface in the molded cover. Next, the outer surface portion of the case is molded using a soft elastomer or other hard polymer to cover the hard part of the cover and the EMD film to form an integral unit. Manufacturing the case in this manner provides a continuous touch-sensitive surface that can be coupled to electrical circuitry within the phone as required.

Figure 5:
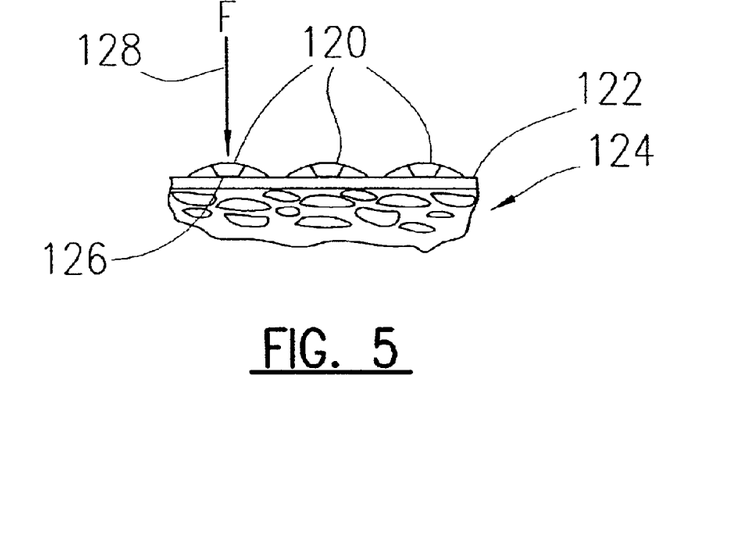
FIG. 5 is a schematic cross sectional view of the EMD film supported for use as a keypad.

FIG. 5 is a schematic cross-sectional view of the EMD film supported for use as a keypad and is similar to the illustration in FIG. 4. In FIG. 5, tactile domes 120 corresponding to each location of a key is placed on the surface 122 of the EMD film 124. The dome 120 provides tactile feedback to a user when the key is pushed. As can be seen from the illustration, the domes 120 contact the surface 122 of the EMD film 124 in the region 126 below the tactile dome, which force F applied by the dome 120 in the direction of arrow 128 causes an electrical signal to be generated by the EMD film. The region of the EMD film beneath the dome 120 is coupled to electronic circuit means that detect the electrical signal when the key is pressed and transforms the signal to the proper information corresponding to the key pushed by the user. In the multi-component injection molding process, the EMD film and the domes are inserted into the mold in contact with the support area in an orientation so that the back of the EMD film is against the support surface and the domes face outward. The final stage of the injection molding covers the surface and domes with a soft elastomer or other hard polymer to form an integral unit of the keypad and cover. Domes providing tactile feedback are well known to those skilled in the art. The domes may be of any known or future developed type to achieve the intended function. The domes may further be carried by a protective polymer sheet or may be overlaid by a protective flexible laminate well know to those in the keypad art. Alternately, the final stage of injection molding may include applying the proper alphanumeric indicia to the corresponding locations of the covering elastomer or polymer.

In alternate embodiments, the EMD film can be configured as the desired functional component, that is, a keypad, microphone, speaker, touch sensor, and the like, in the electronic device without injection molding.

Figure 6:
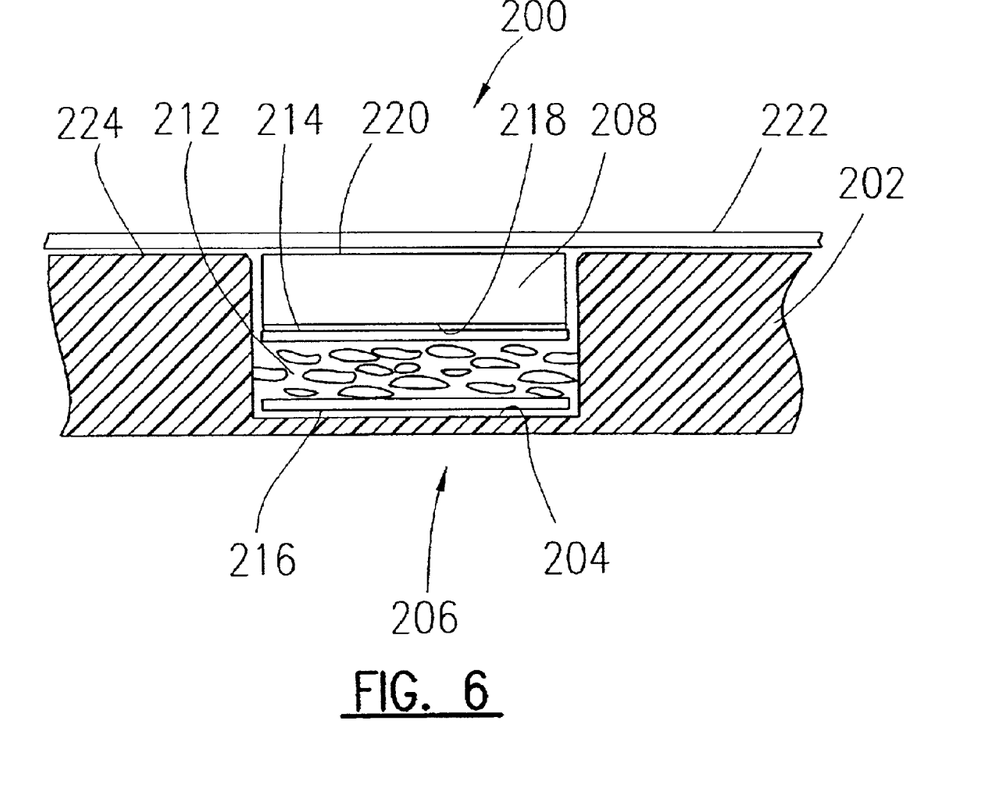
FIG. 6 is a schematic cross-sectional view of the EMD film and display for use as a touch sensitive screen.

Turning now to FIG. 6, a schematic cross-sectional view of a touch sensitive screen for use in a communication device is illustrated therein and generally designated 200. The case 202 has a support surface 204 formed by the relief area 206 sized and shaped in the cover to mount a typical display 208 used with a cellular phone. The display 208 is generally held in place by means of adhesive tape between the bottom side 218 of the display and the surface 204 of the relief area 206. In the embodiment shown in FIG. 6, the EMD film 212 has its oppositely disposed surfaces 214 and 216, respectively, modified to provide high adhesion between the surface 204 of the relief area 206 of the cover and the back surface 218 of the display screen 208. A glue or other adhesive suitable for use with the polymer or other material of the cover and the display is selected to provide maximum adhesion between the EMD film surface 216 and the surface 204 and the back surface 218 of the display so that all movements along the surface 220 of the display 208 are transferred to and sensed by the EMD film 212. A thin flexible protective polymer layer 222 may overlay the surface 220 of the display 208 and the surface 224 of the cover 202. Construction of a touch sensitive screen in this manner has high reliability because dirt, water and other harmful substances cannot enter behind and interfere with the operation of the display screen 208.

Figure 7:
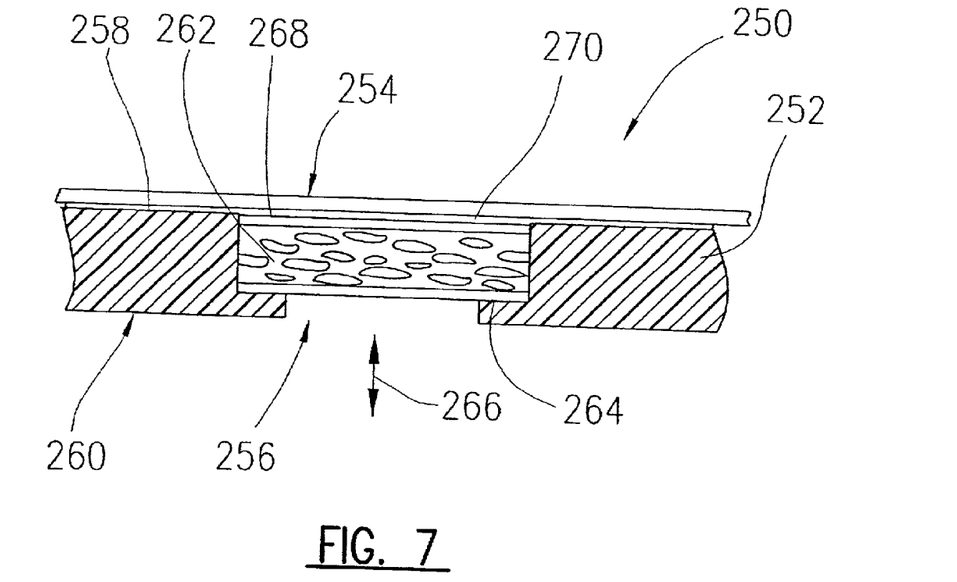
FIG. 7 is a schematic cross section view of the EMD film supported for use as a microphone or a speaker.

Turning now to FIG. 7, a schematic cross-sectional view of the EMD film supported for use as a microphone or speaker is illustrated therein and generally designated 250. The cover 252, is open or voided, that is, there is an absence of material forming the cover in the areas 254, 256 disposed oppositely on the outer side 258 and inner side 260 of the cover 252. The outer side 258 is the surface portion of the cover molded from a soft elastomer or other hard polymer as described above. The EMD film 262 is supported along its peripheral edges 264 to allow the EMD film 262 to deflect or vibrate back and forth in a direction indicated by the arrow 266. The EMD film 262 functions as a microphone and generates an electrical signal having a magnitude and frequency corresponding to the acoustic energy impinging on the surface 268 of the EMD film 262. The electrical signal is coupled from the metal electrodes on the surfaces of the EMD film to electronic circuitry via electrical conductors, printed circuit paths or other conductive means known to those skilled in the electrical arts. In a similar way, the EMD film 262 can function as a speaker and deflect or vibrate back and forth displacing air in contact with the surface of the EMD film to produce acoustic energy having a magnitude and frequency corresponding to an electrical signal coupled to the EMD film from the electronic circuitry of the phone. A thin flexible protective polymer layer 270 may overlay the surface 268 of the EMD film and the surface 258 of the cover 252. The polymer layer 270 must be of sufficient flexibility to not dampen the movement of the EMD film. Alternately, the outer surface of the EMD film can be covered with a decorative material.

Figure 8:
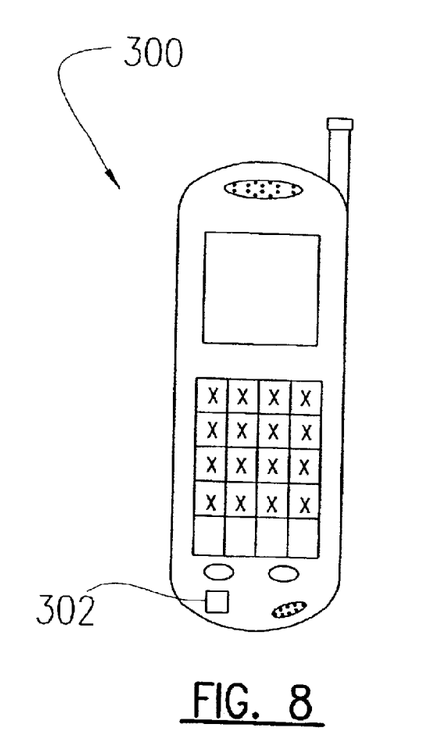
FIG. 8 is a schematic representation of a cellular phone having security access embodying the sensor system of the present invention.

Turning now to FIG. 8, a schematic representation of a cellular phone having security access embodying the sensor system of the invention is shown therein and is substantially similar to the cellular phone described in FIG. 3 and is generally designated 300. The cellular phone 300 includes a fingerprint identification and verification platen 302. The control circuitry of the cellular phone can be programmed or configured to require placement of the finger of an authorized user to the platen 302 to gain initial access to the phone or to complete a call. The EMD film must be supported as described above for use as a sensor and a very thin polymer layer is used on the surface of the EMD film to achieve maximum sensitivity of the surface of the EMD film and to minimize any potential affect on accuracy of the fingerprint recognition system. Fingerprints can be characterized by selecting a minimum number of indicia points corresponding to loops and ridges as well known to those in the fingerprint recognition art. In the present illustration, the user will initially place their finger on the platen in accordance with prompts shown on the cellular phone display. The fingerprint recognition system "learns" the fingerprint in this step and stores it in a memory means as an image or other format for subsequent retrieval and comparison during the call access or completion operations. One or more users can be authorized to access and complete calls with the phone. Since the number of potential users is limited, the recognition process and matching time interval is very short and not inconvenient for a user. Additional safeguards can be employed such as a password used with the fingerprint recognition system.

The display screens of currently known communications devices can also be made to have touch-sensitive screen capability and functionality. In this instance, the EMD film surfaces are suitably made to have adhesion properties similar to the adhesive tape used to hold the current displays in place in the communication device. The so-modified EMD film is substituted for the adhesive tape in the current devices to provide the touch-sensitive screen capability and functionality without modifying or changing the conventional construction and cover. Obviously, the electronics of the communication device are changed to accommodate connection to and operational functionality with the EMD film.

Likewise, any surface of currently known communication devices can be made to have touch-sensitive capability and functionality without modifying or changing the conventional construction and cover of the device. In this instance, the EMD film has a protective flexible layer on one surface and an adhesive layer on its opposite surface to allow the EMD film to be adhesively attached to a surface of the device. The adhesive surface could be self-sticking and have a releasable cover over the adhesive. Again, the electronics of the communication device would be changed to accommodate connection to and operational functionality with the EMD film.

A touch sensitive navigational surface for a communication device has been described above in several preferred embodiments. It will be recognized by those skilled in the art that numerous changes and modifications may be made without departing from the spirit and scope of the invention. For example, the surface of the cover may be made from different materials and not limited to materials that are suitable for injection molding processes only. Therefore the invention has been disclosed by way of illustration and not limitation.

What is claimed is:

1. Method for manufacturing a touch sensitive navigational surface for a communication device of the type having a cover for carrying the appropriate circuitry to carry out the intended functions of the communication device wherein the cover includes an outer wall surface portion for carrying a user interface, the method comprising the steps of:

providing an electromechanical dielectric (EMD) film for activating a corresponding desired user interface operational function to be carried out by the communication device;

providing injection molding apparatus having one or more component molds to carry out an injection molding process for molding the cover;

molding the cover using a suitable injection molding process;

locating and placing the EMD film in an orientation and position in the mold on the outer surface portion of the molded cover such that the EMD film outer surface and the outer wall surface of the molded cover form a substantially continuous surface across the molded cover outer wall surface, and molding the outer wall surface portion of the molded cover and the EMD film outer surface with a thin flexible protective polymer layer thereby forming and defining an integral unit.

2. The method as defined in claim 1 wherein placement of the EMD film corresponds to the associated user interface operational function location on the communication device.

3. The method as defined in claim 1 further including the step of molding the cover with a continuous support surface for the EMD film.

4. The method as defined in claim 3 whereby the EMD film is responsive to a touching contact force made by a user on the surface of the flexible protective polymer layer in the region covering the EMD film.

5. The method as defined in claim 1 further including the step of molding the cover such that only a portion of the EMD film is located on a support surface and a portion is located on an unsupported surface whereby the unsupported portion of the EMD film is free to move with unobstructed motion.

6. The method as defined in claim 1 further including the step of providing a display screen between the EMD film and the flexible protective polymer layer.

7. A communication device having a touch sensitive navigational surface, the communication device having cover for carrying the appropriate electronic circuitry to carry out the intended functions of the communication device, said cover having an outer wall surface portion for carrying a user interface, said device comprising:

an electromechanical dielectric (EMD) film electrically connected to the appropriate electronic circuitry for activating a corresponding desired user interface operational function to be carried out by the communication device;

said cover being an injection molded cover;

said EMD film being oriented and positioned on the outer wall surface portion of the cover for injection molding with the cover whereby the EMD film forms a substantially continuous surface with at least a portion of the outer wall surface of the cover, and a thin flexible polymer layer molded over the outer wall surface of the cover and the EMD film thereby forming and defining an integral unit.

8. The communication device as defined in claim 7 wherein said injection molded cover is molded with a continuous support surface for said EMD film.

9. The communication device as defined in claim 8 wherein the location and placement of said EMD film on said outer surface of said cover corresponds to the associated user interface operational function location on said communication device.

10. The communication device as defined in claim 9 wherein said EMD film functions as a keypad.

11. The communication device as defined in claim 7 further comprising a display screen located between said flexible polymer layer and said EMD film thereby forming and defining a further integral unit.

12. The communication device as defined in claim 11 wherein said injection molded cover is molded with a continuous support surface for said EMD film in the region of said display screen whereby the EMD film is responsive to a touching contact force made by a user on the surface of said thin flexible polymer layer in the region over said display screen.

13. The communication device as defined in claim 7 wherein said injection molded cover is molded such that only a portion of said EMD film is located on a support surface and a portion is located over an unsupported surface whereby said unsupported portion of said EMD film is free to move with unobstructed motion.

14. The communication device as defined in claim 13 wherein said EMD film functions as a speaker.

15. The communication device as defined in claim 13 wherein said EMD film functions as a microphone.

16. A touch sensitive navigational surface for a communication device of the type have a cover for carrying the appropriate electronic circuitry to carry out the intended functions of the communication device, said cover having an outer wall surface portion, said touch sensitive navigational surface comprising:

an electromechanical dielectric (EMD) film oriented and positioned on the outer wall surface portion of the cover for injection molding with the cover, said EMD film forming a part of at least a portion of the outer wall surface defining an injection molded cover;

a thin flexible polymer layer molded over the outer wall surface and said EMD film defining said injection molded cover thereby forming and defining an integral units, and said EMD film being electrically connected to the appropriate electronic circuitry for activating a corresponding function of the communication device in response to a touching contact made by a user along the surface of said flexible polymer layer in the region covering said EMD film.

17. The touch sensitive navigational surface as defined in claim 16 wherein said EMD film functions as a keypad.

18. The touch sensitive navigational surface as defined in claim 16 wherein said EMD film functions as an actuator.

19. The touch sensitive navigational surface as defined in claim 16 wherein said EMD film functions as a user interface with the communication device.

20. Method for manufacturing a communication device having a touch sensitive navigational surface, the communication device having a cover for carrying appropriate circuitry to carry out the intended functions of the communication device, said cover having an outer wall surface portion, said method comprising the steps of:

providing an electromechanical dielectric (EMD) film;

orienting and positioning the EMD film in a mold for the cover;

injection molding the cover and the EMD film such that the EMD film outer surface and the outer wall surface portion of the molded cover form a substantially continuous surface, and molding a thin flexible polymer layer over the injection molded EMD film and outer wall surface portion thereby forming and defining an integral unit.

21. The method as defined in claim 20 wherein the step of orienting and positioning the EMD film includes orienting and positioning the EMD film in a location corresponding to the associated intended function location on the communication device.

22. The method as defined in claim 20 further including the step of molding the cover such that only a portion of the EMD film is located on a support surface and a portion is located on an unsupported surface whereby the unsupported portion of the EMD film is free to move with unobstructed motion wherein the EMD film functions as a microphone.

23. The method as defined in claim 20 further including the step of molding the cover such that only a portion of the EMD film is located on a support surface and a portion is located on an unsupported surface whereby the unsupported portion of the EMD film is free to move with unobstructed motion wherein the EMD film functions as a speaker.

24. The method as defined in claim 20 further including the step of providing a display screen between the EMD film and the thin flexible polymer layer.

* * * * *